United States Patent
Kick et al.

(10) Patent No.: US 11,520,287 B2
(45) Date of Patent: Dec. 6, 2022

(54) EXPOSURE DEVICE FOR RECORDING A HOLOGRAM, METHOD FOR RECORDING A HOLOGRAM, AND METHOD FOR CONTROLLING AN EXPOSURE DEVICE FOR RECORDING A HOLOGRAM

(71) Applicant: Robert Bosch GmbH, Stuttgart (DE)

(72) Inventors: Moritz Kick, Stuttgart (DE); Reinhold Fiess, Durbach (DE)

(73) Assignee: Robert Bosch GmbH, Stuttgart (DE)

( * ) Notice: Subject to any disclaimer, the term of this patent is extended or adjusted under 35 U.S.C. 154(b) by 456 days.

(21) Appl. No.: 16/755,958

(22) PCT Filed: Sep. 20, 2018

(86) PCT No.: PCT/EP2018/075427
§ 371 (c)(1),
(2) Date: Apr. 14, 2020

(87) PCT Pub. No.: WO2019/076572
PCT Pub. Date: Apr. 25, 2019

(65) Prior Publication Data
US 2021/0191318 A1   Jun. 24, 2021

(30) Foreign Application Priority Data

Oct. 18, 2017  (DE) .......................... 102017218544.9

(51) Int. Cl.
*G03H 1/04*       (2006.01)
*G03H 1/02*       (2006.01)

(52) U.S. Cl.
CPC ............. *G03H 1/0402* (2013.01); *G03H 1/02* (2013.01); *G03H 2001/0216* (2013.01); *G03H 2001/0224* (2013.01); *G03H 2001/0439* (2013.01); *G03H 2222/45* (2013.01); *G03H 2223/17* (2013.01);
(Continued)

(58) Field of Classification Search
None
See application file for complete search history.

(56) References Cited

U.S. PATENT DOCUMENTS

| | | | |
|---|---|---|---|
| 2006/0131494 A1* | 6/2006 | Grier | ................... G03H 1/2249 250/251 |
| 2007/0258118 A1 | 11/2007 | Toishi et al. | |
| 2009/0122376 A1 | 5/2009 | Matoba et al. | |
| 2009/0207466 A1 | 8/2009 | Bucklay | |

(Continued)

FOREIGN PATENT DOCUMENTS

| | | |
|---|---|---|
| CN | 1428655 A | 7/2003 |
| CN | 1589422 A | 3/2005 |

(Continued)

OTHER PUBLICATIONS

International Search Report for PCT/EP2018/075427, dated Nov. 29, 2018.

(Continued)

*Primary Examiner* — Jennifer D. Carruth
(74) *Attorney, Agent, or Firm* — Norton Rose Fulbright US LLP; Gerard Messina

(57) ABSTRACT

An exposure device for recording a hologram. The exposure device includes at least one modulation unit, which is designed to generate a modulation beam representing a reference beam and/or an object beam by impressing a modulation representing at least one holographic element of the hologram onto a laser beam. The exposure device also includes at least one reduction unit, which is designed to generate a modified modulation beam using the modulation beam, the modified modulation beam having a smaller beam diameter than the modulation beam. The exposure device further includes at least one objective lens unit, which is designed to direct the modified modulation beam through an immersion medium onto a recording material in order to record the hologram by exposing the recording material to the modified modulation beam.

14 Claims, 5 Drawing Sheets

(52) U.S. Cl.
CPC ..... *G03H 2225/22* (2013.01); *G03H 2225/32* (2013.01); *G03H 2225/60* (2013.01); *G03H 2227/05* (2013.01)

(56) References Cited

U.S. PATENT DOCUMENTS

| | | |
|---|---|---|
| 2011/0002019 A1 | 1/2011 | Routley et al. |
| 2015/0177686 A1 | 6/2015 | Lee et al. |
| 2022/0026850 A1* | 1/2022 | Giehl ................. G03H 1/0402 |

FOREIGN PATENT DOCUMENTS

| | | |
|---|---|---|
| CN | 1790495 A | 6/2006 |
| CN | 1841525 A | 10/2006 |
| WO | 2017149064 A1 | 9/2017 |

OTHER PUBLICATIONS

Bruder Friedrich-Karl et al., "Diffractive Optics in Large Sizes: Computer-Generated Holograms (CGH) Based on Bayfol HX Photopolymer", Visual Communications and Image Processing, San Jose, vol. 9385, 2015. XP060050627.

Ryder Sean Nesbitt, "Edgelit Holography: Extending Size and Color", In: Edgelit Holography: Extending Size and Color, Massachusetts Institute of Technology, 1999, pp. 1-96. XP055250473.

Farmer W J et al., "The Application of the Edge-Lit Format To Holographic Stereograms", Msual Communications and Image Processing, Jan. 20, 2004-Jan. 20, 2004, San Jose, vol. 1461, 1991, pp. 215-226. XP007905802.

* cited by examiner

EXPOSURE DEVICE FOR RECORDING A HOLOGRAM, METHOD FOR RECORDING A HOLOGRAM, AND METHOD FOR CONTROLLING AN EXPOSURE DEVICE FOR RECORDING A HOLOGRAM

FIELD

The present invention is directed to a device and a method for recording a hologram.

BACKGROUND INFORMATION

As a result of holographic materials newly available on the market and the miniaturization of laser sources, new markets and fields of application are becoming increasingly available for holographic optical elements, HOE for short. Potential areas of application such as data goggles or head-up displays are becoming increasingly attractive and could be implemented or improved by the use of holographic optical elements.

To record a hologram, two laser sources (reference wave and object wave) coherent relative to one another are caused to interfere on a photosensitive holographic layer. The resulting interference pattern is then written into the holographic layer. By illuminating this interference structure using the reference wave, it is possible to reconstruct the object wave. The optical function of a volume hologram may, for example, be written into the holographic layer using two different recording methods. On the one hand, the two laser beams may be expanded in a large-scale or analogous recording to the point that the entire holographic layer may be illuminated in one working step. The resultant interference pattern is thus written immediately onto the entire surface of the hologram. An alternative recording method is based on the fact that laser beams having very small beam diameters are caused to interfere, and thus sub-holograms, also referred to as hogels or voxels, are written sequentially into the photosensitive layer, as is shown in FIG. 1. Sequentially exposed or printed (digital) holograms have the advantage that each hogel may be assigned a different optical function. Completely novel optical systems may be manufactured as a result. In addition, manufacturing sequentially printed holograms generally requires significantly lower laser powers as compared to large-scale recorded holograms. The power available when recording large-scale holograms frequently represents a limiting factor for the size of the hologram.

Holographic printers presently available on the market are able to create holograms having a minimal hogel size of between approximately 200 μm and 500 μm. The optical function of the individual hogels in this case is defined, for example, via a spatial modulator for light, also referred to as a spatial light modulator or SLM for short. These holographic printers are mostly used for creating image holograms without having to holograph a real three-dimensional object. A so-called holographic stereogram printer is therefore mostly used. The holograms produced with such a printer use the stereoscopic effect in order to achieve a three-dimensional representation of the printed content. A classic hologram, which is able to reconstruct the original wavefront of the holographed object, is usually not able to be produced using such holographic stereogram printers. For this purpose, so-called holographic wavefront printers are required which, unlike stereogram printers, are also suitable for printing holographic-optical elements. Previously known wavefront printers may, for example, print hogels having a minimum size of approximately 400 μm at maximum image angles of +/−40°.

SUMMARY

In accordance with the present invention, an example exposure device for recording a hologram, an example method for recording a hologram, an example method for controlling an exposure device for recording a holograph, as well as an example control unit that uses this method, are provided.

Advantageous refinements of and improvements on the example devices and methods are possible with the measures described herein.

In accordance with an example embodiment of the present invention, an exposure device for recording a hologram is provided, the exposure device including the following features:
at least one modulation unit, which is designed to produce a modulation beam representing a reference beam and/or an object beam by impressing a modulation representing at least one holographic element of the hologram onto a laser beam;
at least one reduction unit, which is designed to produce a modified modulation beam using the modulation beam, the modified modulation beam having a smaller beam diameter than the modulation beam; and
at least one objective lens unit, which is designed to direct the modulated modulation beam through an immersion medium onto a recording material in order to record the hologram by exposing the recording material to the modified modulation beam.

A modulation unit may, for example, be understood to mean a spatial modulator for light, also referred to as a spatial light modulator, such as, for example, an LCoS display, which is designed to code pieces of information relating to at least one optical function represented by the holographic element into the laser beam. A holographic element may be understood to mean a three-dimensional grid element of the hologram, also referred to as a voxel or hogel, having a particular optical function. The modulation unit may, for example, be designed to produce the modulation beam by modulating an amplitude or phase of a wavefront of the laser beam. Depending on the specific embodiment, the modulation unit may be electronically or optically activatable. The hologram may include a plurality of holographic elements, which may be situated in a grid pattern or overlapping one another and may fulfill different optical functions depending on the specific embodiment. For example, the modulation unit may be designed by modulating the laser beam accordingly, to produce a modulation beam representing a rectangular or Gaussian holographic element. A hologram may, for example, be understood to mean a reflection hologram or transmission hologram or a waveguide.

A reference beam may be understood to mean a wave field, which represents a portion of a laser beam reflected and scattered by an object. A reference beam may be understood to mean a wave field, which represents an unscattered portion of the same light beam. The modulation unit may, for example, be designed to produce the reference beam and the object beam independently of one another via corresponding modulation of the laser beam.

A reduction unit may, for example, be understood to mean an optical system made up of one or of multiple lenses for reducing a beam diameter of the modulation beam, for example, by a reduction factor of 30 to 100.

An objective lens unit may be understood to mean an immersion objective lens directly upstream from the recording material or from a carrier for holding the recording material. In this case, the objective lens unit may be optically coupled or couplable to the recording material via the immersion medium, which may be, for example, a liquid or a gel. The recording material may be understood in general to mean a photosensitive layer, which may be suited, in particular, for manufacturing a holographic optical element. The exposure device may, for example, be designed to record the hologram using the modified modulation beam by sequential, in particular, overlapping exposure of the recording material.

In accordance with the present invention, a holographic wavefront exposure device for holographic optical elements that includes a phase shifter for spatial light modulation, a high-quality reduction optical system, for example, having a magnification of approximately 1 to 60, and an immersion objective lens, for example, having a numerical aperture of greater than 1.1 and an operating distance of greater than 600 µm, which includes an immersion solution having a diffraction index adapted to a holographic material, may be implemented. The immersion solution in this case may, for example, fill a space between the immersion objective lens and a glass plate, which serves as carrier material for the holographic material. The phase shifter may, for example, be designed in order to generate a reference wave or an object wave or both a reference wave as well as an object wave having diffraction angles of greater than 2.5°.

Hogels in the range of between 100 and 200 may advantageously be printed via the three aforementioned points, which allow for angles of incidence and angles of reflection of greater than +/−90°, i.e., over the total reflection angle. Reference wave and object wave may, in particular, be manipulated independently of one another by such an exposure device.

With the optional use of a phase-shifting modulator unit having a large diffraction angle in the reference beam path and object beam path, it is possible, for example, to produce holographic optical elements compounded of sub-holograms, which include variously definable optical functions. Furthermore, it is possible in combination with the reduction optical system to manufacture holographic optical elements having very large angles of incidence or angles of reflection up to and including waveguide structures—in contrast to previous holographic wavefront printers, in which angles of incidence and angles of reflection are generally severely limited and the reference beam is usually a flat wave, in which at most the angle of incidence may be varied.

A further advantage of an exposure device according to one specific embodiment of the present invention is that instead of rectangular hogels, Gaussian hogels may optionally also be exposed and superimposed on one another.

With the softer transitions between the individual hogels, it is possible to avoid or at least significantly reduce a grid structure of the hologram, as it may form, in particular, when using rectangular apertures for shaping hogels, and which may possibly adversely affect the image quality. Thus, by overlapping the Gaussian hogels, it is possible to improve the image quality. This effect may be still further optimized by an optional subsequent copying process.

One optional specific embodiment of the present invention enables the recording of reflection holograms if two separate beam paths including one modulation unit each are used for exposing. If only one beam path is used, the object wave and reference wave may then also be produced by only one modulation unit. Transmission holograms may therefore also be printed.

In summary, the advantages of example embodiments of the present invention may include the very large optical angles or angular ranges in the direction of incidence and direction of radiation to beyond the total reflection angle, the selectable reference wave and object wave in each hogel through the possible use of a phase modulator in both partial beams, the improved image quality as a result of Gaussian, overlapping hogels, and the possibility of producing reflection holograms as well as transmission holograms and holographic optical elements having variously definable optical functions to and including coupling and uncoupling holograms for waveguide structures.

With the optional incorporation of two CMOS cameras into beam paths of the exposure device assigned to one partial beam each of a laser beam, it is also possible to ensure an exact and simple adjustment of the two partial beams while simultaneously optimizing the exposure time.

According to one specific embodiment of the present invention, the modulation unit may be designed to impress the modulation by shifting a phase of the laser beam. In this way, the hologram may be produced having preferably large angles of incidence and angles of reflection.

The modulation unit in this case may be designed as a LCoS display. In this way, a propagation direction and a divergence of the modulation beam may be very precisely modified across a large adjustment range.

According to a further specific embodiment of the present invention, the modulation unit may have a pixel structure made up of pixels having a size of smaller than 4 µm. In addition or alternatively, the modulation unit may be designed to radiate the modulation beam at a diffraction angle of greater than 2.5 degrees into a beam path to the reduction unit. Optical functions of the hologram may be flexibly defined and simply implemented with this specific embodiment as well.

It is advantageous if the objective lens unit includes a numerical aperture of greater than 1.1 or, in addition or alternatively, an operating distance to the recording material of greater than 600 µm. In this way, the hologram may be recorded having very small hogels, in particular, having a size of smaller than 400 µm.

It is also advantageous if the reduction unit is designed to produce the modified modulation beam having a beam diameter of between 100 µm and 200 µm. The size of the hogels may be significantly reduced with this specific embodiment as well.

According to a further specific embodiment of the present invention, the reduction unit may include at least one first imaging unit representing a first Kepler telescope and a second imaging unit representing a second Kepler telescope. In this case, the first imaging unit and the second imaging unit may be optically connected in series. A Kepler telescope may be understood in general to mean an imaging optical system made up of a large, slightly curved convergent lens as the objective lens and a relatively small, more sharply curved convergent lens as the ocular. The two convergent lenses may, for example, be positioned opposite one another. With this specific embodiment, it is possible to precisely reduce the beam diameter with little technical effort. In addition, a significant increase of deflection angles produced by the modulation unit may be achieved as a result.

The exposure device may optionally include at least one adjustment unit for adjusting the modulation beam and/or the modified modulation beam. The adjustment unit may be designed, in particular, as a CMOS element. Exposure errors may be avoided as a result.

According to a further specific embodiment of the present invention, the exposure device may further include a positioning unit, which may be designed to position the recording material relative to the objective lens unit, in order to enable a sequential exposure of the recording material using the modified modulation beam. A positioning unit may, for example, be understood to mean a movable table or the like. As a result, it is possible to record holograms including sub-holograms that differ from one another in their optical functions.

It is particularly advantageous if the exposure device includes an additional modulation unit, an additional reduction unit and an additional objective lens unit, the modulation unit, the reduction unit and the objective lens unit being able to be assigned to a first beam path for exposing the recording material, and the additional modulation unit, the additional reduction unit and the additional objective lens unit being able to be assigned to a second beam path for exposing the recording material. The additional modulation unit may be designed to produce an additional modulation beam by impressing an additional modulation representing the holographic element onto an additional laser beam. An additional laser beam may, for example, be understood to mean a partial beam of the laser beam produced by beam splitting. The modulation beam in this case may represent the reference beam and the additional modulation beam may represent the object beam. The additional reduction unit may be designed to produce an additional modified modulation beam using the additional modulation beam. The additional modified modulation beam may have a smaller beam diameter than the additional modulation beam. The additional objective lens unit may be designed to direct the additional modified modulation beam through an additional immersion medium onto the recording material and to cause it to interfere with the modified modulation beam on the recording material in order to record the hologram. In this way, reflection holograms may be produced with the aid of the exposure device.

According to a further specific embodiment of the present invention, the objective lens unit may be designed to direct the modified modulation beam onto a first side of the recording material. The additional objective lens unit may be designed to direct the additional modified modulation beam onto a second side of the recording material opposite the first side. In this way, the recording material may be exposed on both sides simultaneously.

The present invention also provides an example method for recording a hologram with the aid of an exposure device according to one of the preceding specific embodiments, the method including the following steps:
impressing the modulation representing the holographic element onto the laser beam in order to produce the modulation beam;
reducing a beam diameter of the modulation beam in order to generate the modified modulation beam; and
directing the modified modulation beam through the immersion medium onto the recording material in order to record the hologram.

The present invention further provides an example method for controlling an exposure device according to one of the preceding specific embodiments, the method including at least the following step:

outputting an activation signal to an interface to the modulation unit in order to impress the modulation representing the holographic element onto the laser beam.

This example method may, for example, be implemented in software or hardware or in a mixed form made up of software and hardware, for example, in a control unit.

The present invention further provides an example control unit, which is designed to carry out, activate or implement a variant of a method presented herein in corresponding units. With this embodiment variant of the present invention in the form of a control unit as well, it is possible to quickly and efficiently achieve the object underlying the present invention.

For this purpose, the control unit may include at least one processing unit for processing signals or data, at least one memory unit for storing signals or data, at least one interface to a sensor or to an actuator for reading in sensor signals from the sensor or for outputting control signals to the actuator and/or at least one communication interface for reading in or outputting data, which are embedded in a communication protocol. The processing unit may, for example, be a signal processor, a microcontroller or the like, the memory unit capable of being a flash memory, an EPROM or a magnetic memory unit. The communication interface may be designed to read in or output data wirelessly and/or in a hardwired manner, a communication interface, which is able to read in or output hardwired data, being capable, for example, of reading in these data electrically or optically from a corresponding data transmission line or outputting these data into a corresponding data transmission line.

A control unit in the present case may be understood to mean an electrical device, which processes sensor signals and, as a function thereof, outputs control signals and/or data signals. The control unit may include an interface, which may be designed in hardware and/or in software. In a hardware design, the interfaces may, for example, be part of a so-called system ASIC, which contains a wide variety of functions of the control unit. It is also possible, however, for the interfaces to be dedicated integrated circuits or to be made at least partly of discrete components. In a software design, the interfaces may be software modules, which are present, for example, on a microcontroller alongside other software modules.

BRIEF DESCRIPTION OF EXAMPLE EMBODIMENTS

Exemplary embodiments of the present invention are depicted in the figures and explained in greater detail below.

FIG. 1 schematically shows a representation of a large-scale recording of a holographic lens through two point light sources.

FIG. 2 schematically shows a representation of a sequential recording of a holographic lens through two point light sources.

FIG. 3 schematically shows a representation of an exposure device according to one exemplary embodiment.

FIG. 4 schematically shows a representation of a waveguide structure including two holographic optical elements, recorded by an exposure device according to one exemplary embodiment.

FIG. 5 schematically shows a representation of a reduction unit according to one exemplary embodiment.

FIG. 6 schematically shows a representation of an exposure device according to one exemplary embodiment.

Figure 9:
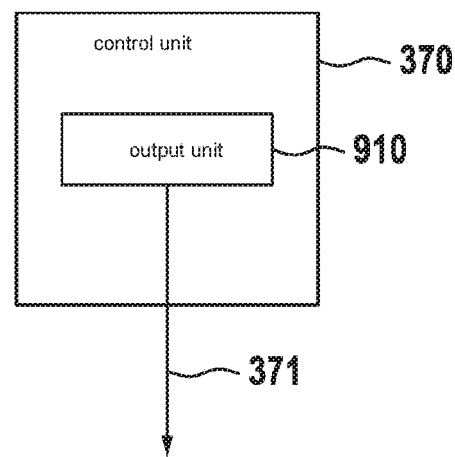

FIG. 9 schematically shows a representation of a control unit according to one exemplary embodiment.

In the following description of preferred exemplary embodiments of the present invention, identical or similar reference numerals are used for elements which are represented in the various figures and act similarly, a repeated description of these elements being omitted.

DETAILED DESCRIPTION OF EXAMPLE EMBODIMENTS

Figure 1:
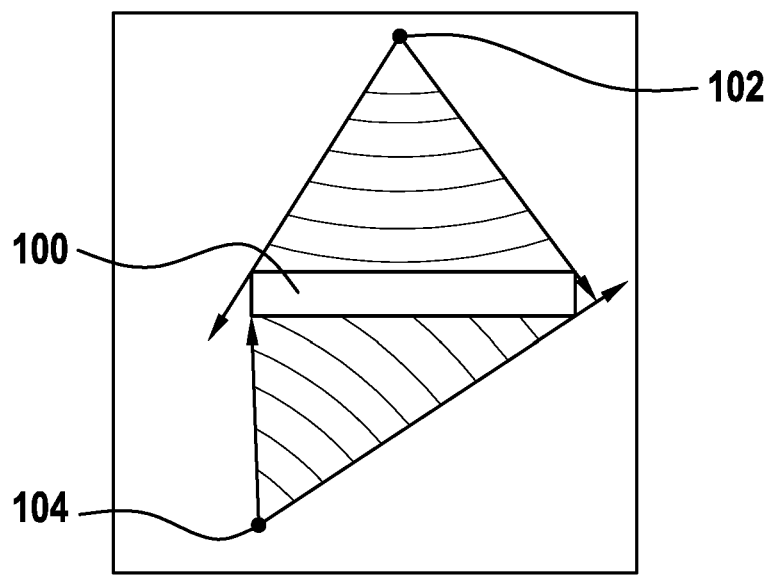

FIG. 1 schematically shows a representation of a large-scale recording of a holographic lens 100 through two point light sources 102, 104.

Figure 2:
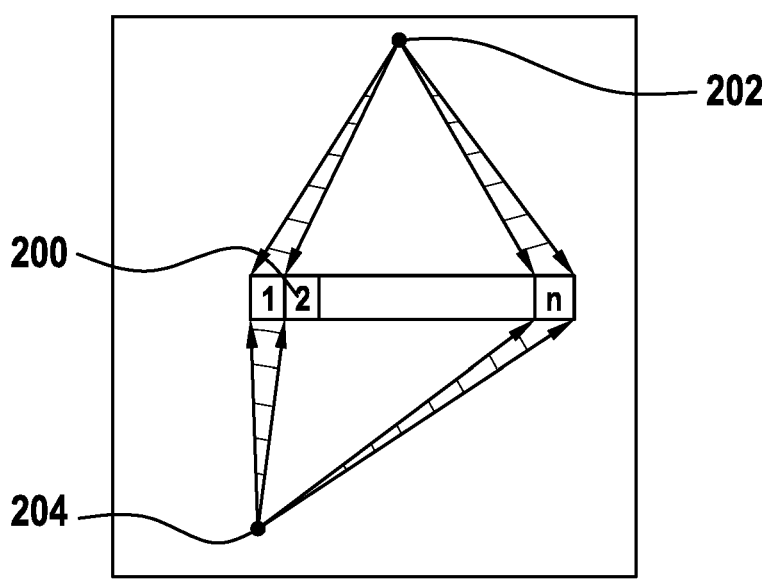

FIG. 2 schematically shows a representation of a sequential recording of a holographic lens 200 through two point light sources 202, 204. The principle of recording a hologram via the sequential recording of a plurality of sub-holograms 1, 2 . . . n, shown in FIG. 2 may, for example, be implemented by an exposure device described in greater detail below.

FIGS. 1 and 2 show a comparison of the large-scale analogous recording in holographically imaging elements and the sequential (digital) recording as exemplified by a holographic off-axis parabolic mirror.

Figure 3:
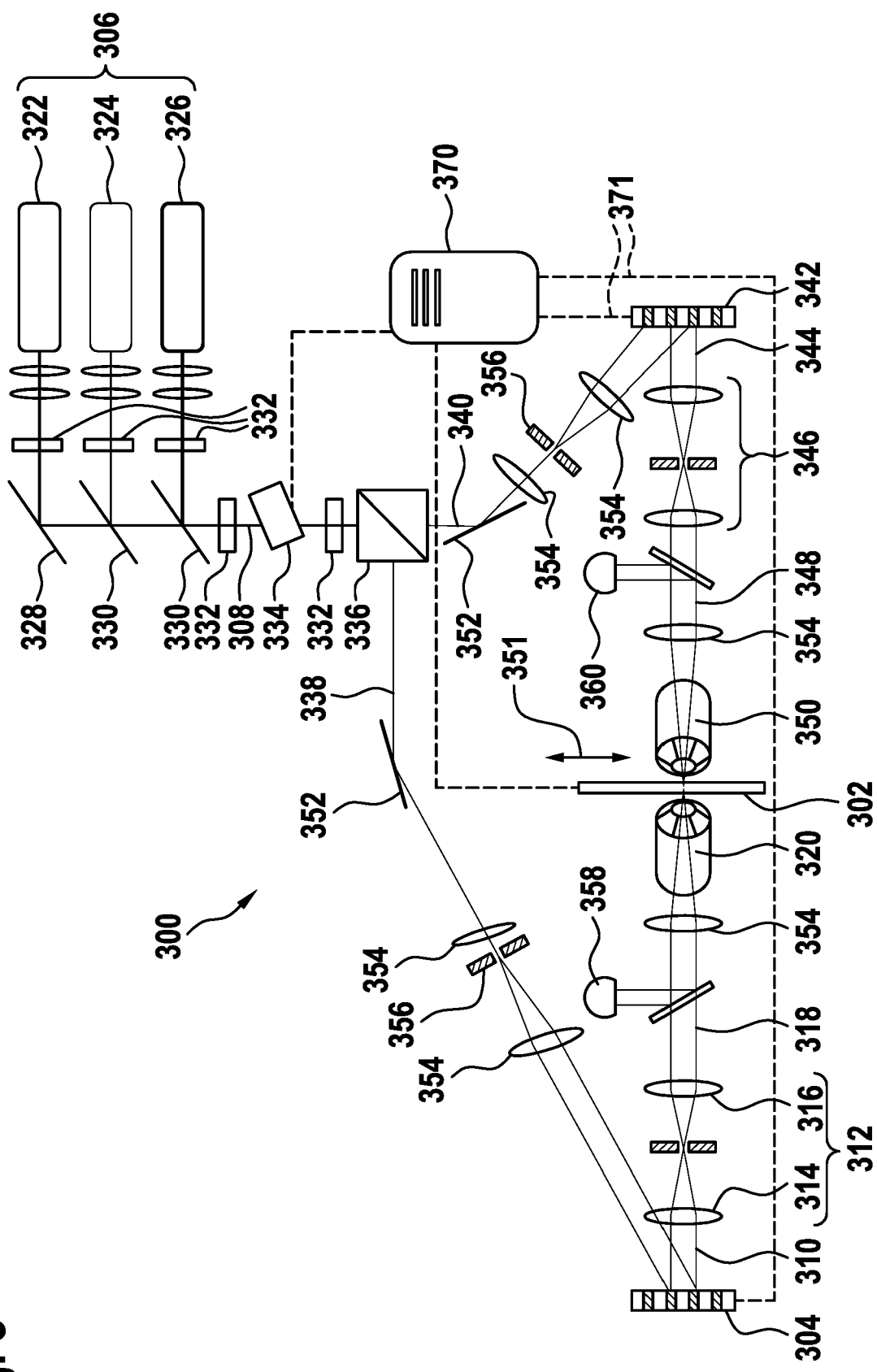

FIG. 3 schematically shows a representation of an exposure device 300 according to one exemplary embodiment. One possible design is shown of an entire system that includes exposure device 300 for producing a hologram by exposing a photosensitive, holographic recording material 302, here, a holographic optical element, continuous lines representing optical paths and dotted lines representing electrically conductive connections. Exposure device 300 includes a modulation unit 304, also referred to as spatial light modulator or SLM for short, which is designed to impress a spatial modulation on a laser beam 308 produced by a laser source 306 or also on a partial beam of laser beam 308 produced by beam splitting laser beam 308 in such a way that a modulation beam 310 produced by the spatial modulation represents either a reference beam or an object beam for exposing recording material 302. According to one particularly advantageous exemplary embodiment, modulation unit 304 is designed to produce modulation beam 310 by shifting a phase of laser beam 308 or of the partial beam of laser beam 308.

Modulation unit 304 radiates modulation beam 310 into a beam path to a reduction unit 312, which is designed to reduce a beam diameter of modulation beam 310, for example, via at least two convergent lenses 314, 316 connected in series or other suitable optical elements, by a particular reduction factor and to emit a correspondingly modified modulation beam 318 having a significantly reduced beam diameter compared to modulation beam 310 into a beam path to a downstream objective lens unit 320.

Objective lens unit 320 is designed as an immersion objective lens in order to optically couple modified modulation beam 318 to recording material 302 using a suitable immersion medium such as, for example, an immersion liquid or an immersion gel. Modified modulation beam 318 is thus directed through the immersion medium onto recording material 302, into which a corresponding sub-hologram, also referred to as a holographic element, voxel or hogel is printed, depending on the modulation of modified modulation beam 318.

According to the exemplary embodiment shown in FIG. 3, laser source 306 includes a first laser generating unit 322 for generating a red laser beam having a wavelength $\lambda=640$ nm, a second laser generating unit 324 for generating a green laser beam having a wavelength $\lambda=515$ and a third laser generating unit 326 for generating a blue laser beam having a wavelength $\lambda=457$ nm. A highly reflective mirror 328 directs the red laser beam to a dichroic beam combiner 330, which is designed to combine the red laser beam together with the green laser beam and the blue laser beam to form laser beam 308. $\lambda/2$ platelets situated in the respective beam paths of the different colored laser beams or of laser beam 308 are each identified by reference numeral 332.

Laser beam 308 passes via an acousto-optical filter 334 further to a beam splitter 336, here a polarizing beam splitter, which is designed to split laser beam 308 into a first partial beam 338 and a second partial beam 340, to direct first partial beam 338 into a first optical path leading to modulation unit 304 and second partial beam 340 into a second optical path leading to an additional modulation unit 342.

Accordingly, modulation unit 304 is designed to generate the object beam as modulation beam 310 using first partial beam 338, whereas additional modulation unit 342 is designed, similarly to modulation unit 304, to generate an additional modulation beam 344 representing the reference beam by impressing a corresponding spatial modulation onto second partial beam 340.

An additional reduction unit 346 for generating an additional modified modulation beam 348 having a beam diameter significantly reduced by a corresponding reduction factor compared to additional modulation beam 344 is situated, similarly to the first optical path, in a beam path between additional modulation unit 342 and recording material 302. Additional reduction unit 346 is downstream from an additional objective lens unit 350, which is designed similarly or identically to objective lens unit 320 as an immersion objective lens for coupling additional modified modulation beam 348 via an additional immersion medium into recording material 302. The two modified modulation beams 318, 348 are caused to interfere at recording material 302 and in this way produce a reflection hologram, for example. The hologram is recorded, in particular, by sequentially exposing recording material 302, for example, for recording overlappingly a plurality of sub-holograms with the aid of positioning unit 351, for example, a XY-sliding table, indicated merely schematically here by a double arrow.

Exposure device 300 shown in FIG. 3 includes, for example, additional highly reflective mirrors 352, focusing elements 354, for example, in the form of lenses, optical spatial filters 356 as well as a first adjustment unit 358 for adjusting modified modulation beam 318, which is situated in a beam path between reduction unit 312 and objective lens unit 320, and a second adjustment unit 360 for adjusting additional modified modulation beam 348, which is situated in a beam path between additional reduction unit 346 and additional objective lens unit 350. It is particularly advantageous if at least one of the two adjustment units 358, 360 is designed as a CMOS camera.

According to the exemplary embodiment shown in FIG. 3, a control unit 370 is designed to activate the two modulation units 304, 342 by outputting a corresponding activation signal 371 in such a way that recording material 302 is exposed on both sides in a suitable manner. Control unit 370 is optionally designed to activate positioning unit 351 or also acousto-optical filter 334 as a function of the activation of the two modulation units 304, 342, for example, in order to sequentially expose recording material 302.

Exposure device 300 shown in FIG. 3 is designed, for example, as a holographic wavefront printer for sequentially exposing recording material 302, for example, a holographic layer. The wavefronts of reference wave and object wave are newly adapted in this case by modulation units 304, 342 depending on the desired optical function and superposed on recording material 302. Reductions of the beam diameter by the factor 60 are achievable, for example, with the optical system including objective lens units 320, 350.

Various exemplary embodiments of the present invention are described once again in other terms below with reference to FIG. 3.

The form of hogels is usually defined by apertures, which are introduced into the beam path. This may cause diffraction effects to occur at the edges of the apertures, which may have a noticeable negative impact during the exposure of the hogels. Hard transitions between the individual rectangular hogels also form a type of grid structure, which may be noticeably disruptive when observing the hologram, in particular, in the case of larger hogels.

A hogel size of over 400 µm is usually sufficient for image holograms in order to sufficiently suppress disruptive effects. This is due primarily to the fact that image holograms are observed for the most part from a greater distance. If, however, such hogel sizes are used for manufacturing holographic optical elements for imaging applications such as head-up displays or data goggles, then hogels of this size in the form of grid structures may be perceived to be disruptive.

In order to define the optical function for the individual hogels, at least the object beam is shaped by modulation unit 304, for example, by a spatial light modulator in the form of a LCD display or LCoS display. For this purpose, amplitude-modulating LCoS displays having full high-definition resolution and a pixel size of approximately 8 µm may be used, for example. The object beam is then manipulated via the placement of different diffraction patterns with the aid of modulation unit 304. Whereas the image information together with the emission characteristics is defined by modulation unit 304 for producing stereograms, a suitable wavefront is generated with the aid of modulation 304 when printing holographic optical elements. In this sense, exposure device 300 may also be referred to as a holographic wavefront printer. The maximum image angle of the holographic optical element is determined by the pixel size of modulation unit 304 and, therefore, by the maximum diffraction angle into the use order and by the reduction scale with which modulation unit 304 is imaged onto recording material 302.

Figure 5:
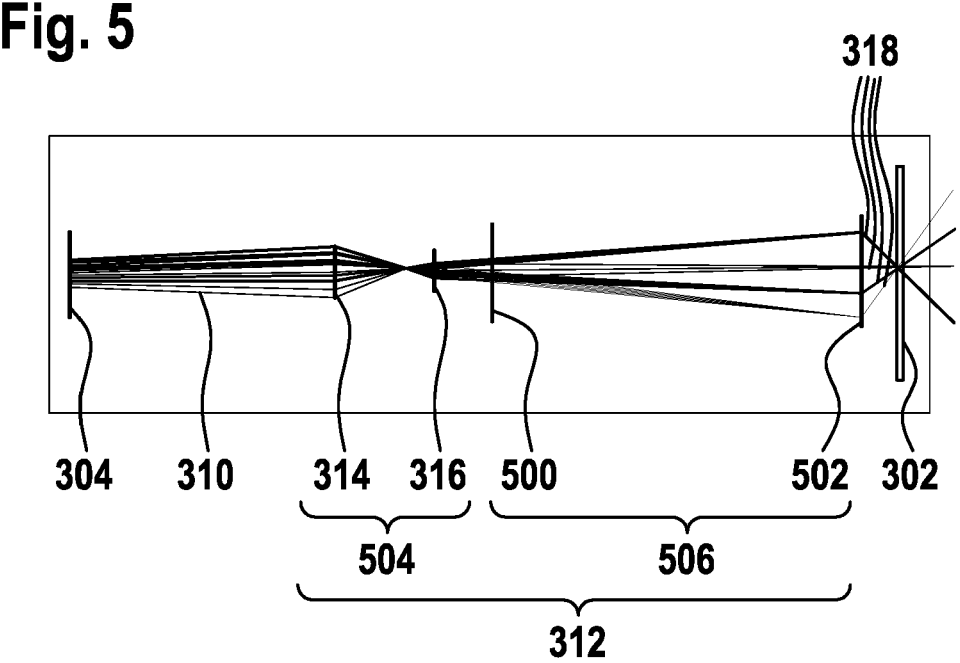

For this purpose, a continuous wave laser beam or pulsed laser beam 308, compounded monochromatically or of up to four wavelengths, is divided by beam splitter 336 onto two optical paths, an object beam path and a reference beam path. Both optical paths may be identically structured. For the purpose of wavefront modulation, phase-shifting SLMs, for example, LCoS displays having a sufficiently small pixel structure of less than 4 µm, are inserted as modulation units 304, 342 into both beam paths. In this way, it is possible, for example, to adapt the propagation direction and divergence of partial beams 338, 340. Both partial beams 338, 340 are then guided through an optical system, each of which is compounded of two Kepler telescopes, and which having a reduction factor of 60, for example. Thus, on the one hand, the beam diameter of the two partial beams is reduced in each case to approximately 100 µm to 200 µm; on the other hand, the deflection angles produced by modulation units 304, 342 are significantly increased. An illustration of this imaging optical system is shown in FIG. 5.

The last optical system in front of recording material 302 is designed in both optical paths, for example, in each case as a high-quality immersion objective lens having a small numerical aperture of, for example, greater than 1.1 at an operating distance of, for example, greater than 600 µm, which is relatively large for such objective lenses. Angles that are larger than the internal total reflection angle when reconstructing the holographic optical element in air may be written into recording material 302 by using an immersion liquid between objective lens units 320, 350 and a glass carrier on which recording material 302 is laminated, for example, and as a result of the significant increase in the deflection angle and the numerical aperture of greater than 1.1. In this way, it is possible to implement arbitrary optical systems having very large angles of incidence and angles of reflection as well as coupling and uncoupling holograms for waveguide structures, as shown, for example, in FIG. 4.

Figure 6:
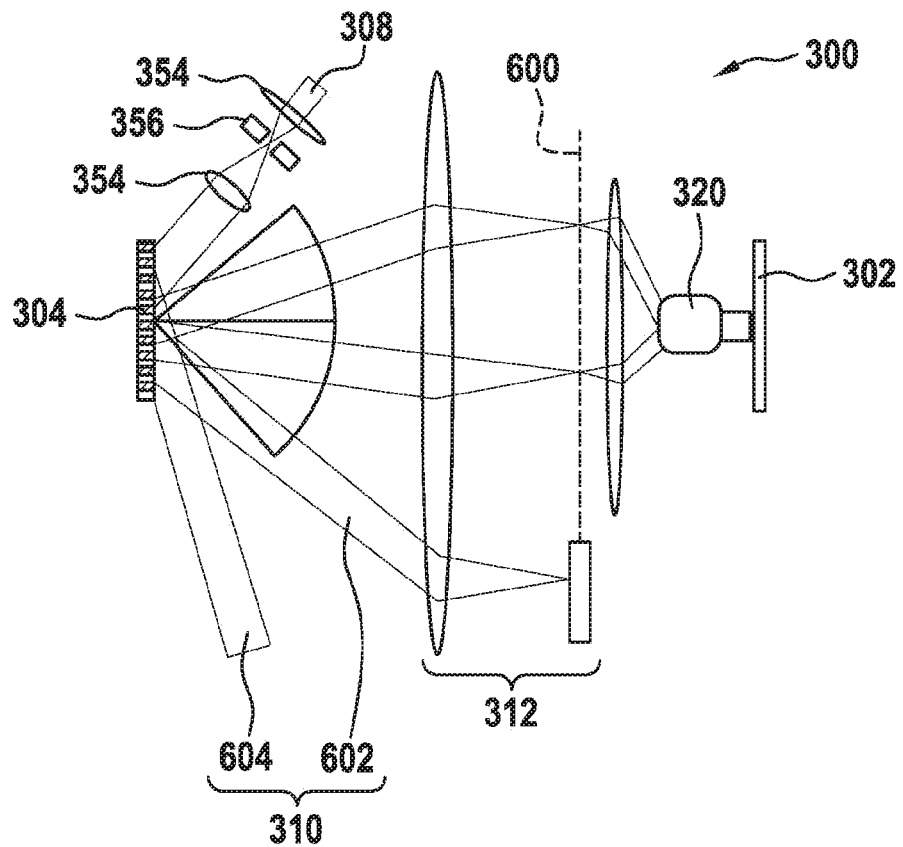

Reflection holograms may be defined by using both optical paths. If only one of the two optical paths is used, as is shown in FIG. 6, both the object wave as well as the reference wave may be generated by the placement of suitable diffraction patterns on modulation unit 304. Transmission holograms may be produced as a result of both beam paths impacting recording material 302 from the same side.

To expose the hogels, the two partial beams 338, 340 are caused to interfere in recording material 302. Since the hogels have a diameter of between 100 µm and 200 µm, the adjustment when recording reflection holograms may very complex. The adjustment may be simplified by inserting the two adjustment units 358, 360, for example, of CMOS cameras, into the respective beam paths. This requires both optical systems or paths to be identical to one another. On the one hand, back reflections of the one beam path are directed on the objective lens using a beam splitter, on the other hand, however, the beam propagated through the two identical optical systems is also directed to an adjustment unit.

If the same diffraction pattern is applied to both modulation units 304, 342, then these two partial beams should be superimposed on the adjustment unit in order to achieve a positive superimposition of the two partial beams in recording material 302.

An exposure time during the recording of the holograms may also be optimized by recording hogels using different exposure times and subsequently reconstructing them using the object beam. The higher the diffraction efficiency of the hogel is, the greater is the amount of light that reaches the adjustment unit during the reconstruction process. This process is also used for fine adjustment, since the efficiency of the hogel increases when the two beam paths are perfectly superimposed in recording material 302.

Recording material 302 is positioned, for example, after a hogel is exposed, by a highly precise XY sliding table as positioning unit 351 in such a way that the next hogel may be exposed. In this case, it should be noted that the hogels overlap in such a way as to ensure a preferably homogeneous exposure of recording material 302. In this way, it is possible to avoid the visible grid structure, which normally forms as a result of the sequential exposure of rectangular hogels displaced equidistantly to one another.

Since the hogels are very small and very high intensities may thus be achieved, the exposure time for a single hogel is very short, for example, a maximum of 100 ms. To suppress vibrations that may influence the interference pattern even during this short exposure period, the XY sliding table is fastened on a massive granite substructure. The granite substructure stands on a vibration-dampening optical table.

The maximum diffraction angles of the use order at the modulation units may be described by the following formula, a being the diffraction angle, λ being the wavelength and g being the grid constant.

$$\sin\alpha = \pm \frac{\lambda}{2g}$$

The factor 2 in the denominator results because, as is apparent in FIG. 6, the first diffraction order is used in such a way that both positive as well as negative angles with respect to the optical axis may be achieved.

The maximum diffraction angle is achieved with a minimal grid constant. This is provided by the pixelated structure of the modulation units when a black-white pattern is applied. The grid constant is then double the pixel structure. Grid constants smaller than three times the pixel structure should, however, not be used when operating the modulation units, in order to reduce disruptive effects occurring with grid constants that are too small.

The aplanatic imaging of the modulation units on the recording material with the imaging scale M results in the Abbè sine condition, the enlarged angle according to the imaging optical system being designated by ß:

$$\sin\alpha = M \cdot \sin \beta$$

M<1, i.e., for example, M=1/60 applies to the reducing images.

Since an immersion objective lens with an immersion liquid is used as the objective lens unit, the angles should be adapted accordingly. The immersion liquid has a refractive index, for example, of n≈1.51. Thus, according to Snell's Law of Refraction $$\sin \beta = n \cdot \sin \gamma$$

applies to angle γ in the immersion liquid or in the holographic material.

Compounded, this means:

$$\sin\gamma = \pm \frac{\frac{\lambda}{2g}}{n \cdot M}$$

n≈1.51, M=1/60, λ=457 nm and g=12 μm yields:
γ=49.2°>42°=TIR air/gas (TIR=total internal reflection)

Figure 4:
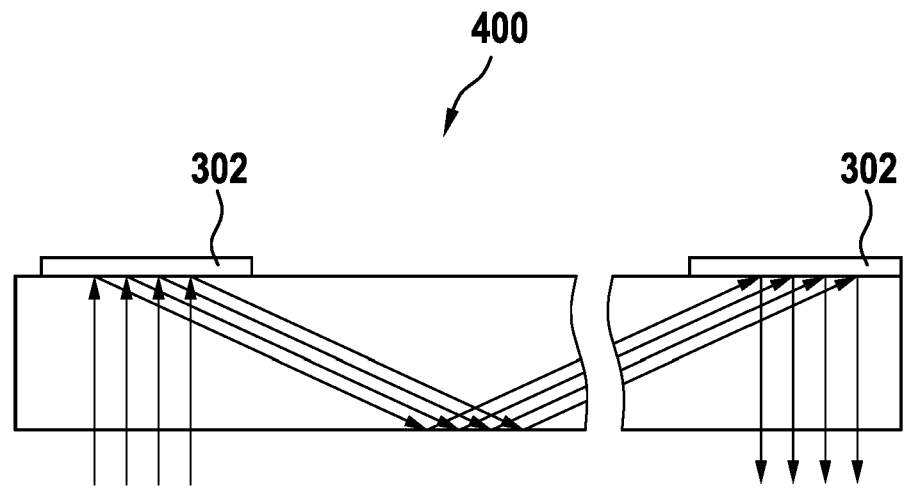

FIG. 4 schematically shows a representation of a waveguide structure 400 including two holographic optical elements 302, recorded using an exposure device according to one exemplary embodiment, for example, the exposure device described above with reference to FIG. 3. Waveguide structure 400 is produced, for example, from glass and surrounded by air. A beam path through waveguide structure 400 is indicated by a plurality of arrows. As is apparent from FIG. 4, coupling and uncoupling elements for waveguide structures may be produced with the aid of the exposure device by defining holographic optical elements 302 as having an angle above an angle of the internal total reflection. This is possible, for example, due to a particularly small pixel structure of the modulation unit and to a numerical aperture of greater than 1.1 of the objective lens unit in connection with a suitable immersion solution between the objective lens unit and the recording material or between the objective lens unit and a (glass) carrier for holding the recording material.

FIG. 5 schematically shows a representation of a reduction unit 312 according to one exemplary embodiment of the present invention, for example, of a reduction unit described above with reference to FIG. 3. Reduction unit 312 includes first convergent lens 314, second convergent lens 316, as well as a third convergent lens 500 and a fourth convergent lens 502, first convergent lens 314 and second convergent lens 316 functioning as a first Kepler telescope 504 and third convergent lens 500 and fourth convergent lens 502 functioning as a second Kepler telescope 506. For example, the four convergent lenses 314, 316, 500, 502 are situated in series one behind the other.

Flat waves having different deflection angles are shown, adjusted at modulation unit 304. The beam diameter of the flat wave is reduced via the two Kepler telescopes 504, 506 and, at the same time, an angle of incidence to recording material 302 is significantly increased. A spatial filtering of higher diffraction orders may also be undertaken in the Fourier plane of first Kepler telescope 504.

In the Fourier plane of first Kepler telescope 504, which has a reduction factor of 2 to 4, for example, the zeroed and higher orders are filtered, so that only the use order, i.e., the first diffraction order of modulation unit 304, passes the filter.

FIG. 6 schematically shows a representation of an exposure device 300 according to one exemplary embodiment of the present invention. Exposure device 300 shown in FIG. 6 corresponds essentially to the exposure device described above with reference to FIG. 3, with the difference that exposure device 300 according to this exemplary embodiment includes merely the first optical path including modulation unit 304, reduction unit 312 and objective lens unit 320. A Fourier plane 600 is also indicated. In this case, two use orders programmable separately from one another in an angular range+/−α are generatable with the aid of modulation unit 304, also referred to as beam splitting. A beam path of a 0. order is marked with reference numeral 602, a beam path of a −1. order is marked with reference numeral 604.

Modulation beams 310 generated separately from one another with the aid of modulation unit 304 are used as a reference wave or object wave when recording the hologram. Exposure device 300 may thus be implemented as a holographic wavefront printer for generating transmission holograms.

Figure 7:
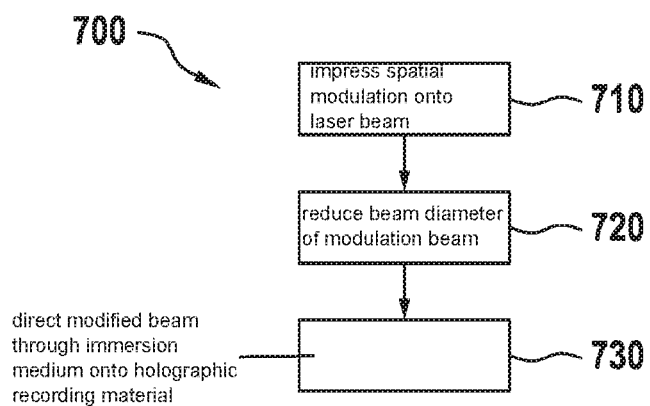
FIG. 7 shows a flow chart of a method for recording a hologram with the aid of an exposure device according to one exemplary embodiment.

FIG. 7 shows a flow chart of a method 700 for recording a hologram with the aid of an exposure device according to one exemplary embodiment of the present invention, for example, of an exposure device described above with reference to FIGS. 3 through 6. In this case, the spatial modulation representing the holographic element is impressed onto the laser beam in a first step 710, in order to generate the modulation beam, either in the form of a reference wave or of an object wave. In a second step 720 the beam diameter of the modulation beam is reduced significantly. The modified modulation beam generated thereby is directed in a third step 730 through the immersion medium of the objective lens unit onto the holographic recording material, in order to expose the recording material in a suitable manner for producing the hologram or at least one sub-hologram of the hologram.

Figure 8:
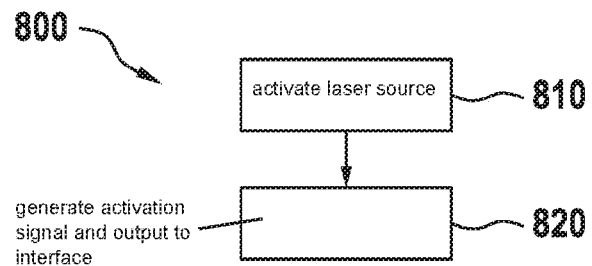
FIG. 8 shows a flow chart of a method for controlling an exposure device according to one exemplary embodiment.

FIG. 8 shows a flowchart of a method 800 for controlling an exposure device according to one exemplary embodiment of the present invention, for example, of an exposure device described above with reference to FIGS. 3 through 7. According to this exemplary embodiment, method 800 includes an optional step 810 of activating the laser source. In an additional step 820, the activation signal is generated in response to the activation and output to an interface to the modulation unit of the exposure device, in order to modulate the laser beam in a suitable manner, for example, by accordingly adjusting y a pixel structure of the modulation unit.

FIG. 9 schematically shows a representation of a control unit 370 according to one exemplary embodiment of the present invention, for example, of a control unit described above with reference to FIG. 3. Control unit 370 includes an output unit 910 for outputting activation signal 371 for activating the modulation unit or multiple modulation units or also other elements of the exposure device controllable in conjunction with the generation of the hologram.

If an exemplary embodiment includes an "and/or" linkage between a first feature and a second feature, this is to be read in the sense that the exemplary embodiment according to one specific embodiment includes both the first feature and the second feature, and according to another specific embodiment, either only the first feature or only the second feature.

What is claimed is:

1. An exposure device for recording a hologram, the exposure device comprising:
   at least one modulation unit configured to generate a modulation beam representing a reference beam and/or an object beam by impressing a modulation representing at least one holographic element of the hologram on a laser beam;
   at least one reduction unit configured to generate a modified modulation beam using the modulation beam, the modified modulation beam having a smaller beam diameter than the modulation beam; and
   at least one objective lens unit configured to direct the modified modulation beam through an immersion medium onto a recording material to record the hologram by exposing the recording material to the modified modulation beam.

2. The exposure device as recited in claim 1, wherein the modulation unit is configured to impress the modulation by shifting a phase of the laser beam.

3. The exposure device as recited in claim 1, wherein the modulation unit is a LCoS display.

4. The exposure device as recited in claim 1, wherein the modulation unit: (i) has a pixel structure made up of pixels having a size of less than 4 μm and/or (ii) is configured to radiate the modulation beam) at a diffraction angle of greater than 2.5 degrees into a beam path to the reduction unit.

5. The exposure device as recited in claim 1, wherein the objective lens unit has (i) a numerical aperture of greater than 1.1, and/or (ii) an operating distance to the recording material of greater than 600 μm.

6. The exposure device as recited in claim 1, wherein the reduction unit is configured to generate a beam having a beam diameter between 100 μm and 200 μm as the modified modulation beam.

7. The exposure device as recited in claim 1, wherein the reduction unit includes a first imaging unit representing a first Kepler telescope and a second imaging unit representing a second Kepler telescope, the first imaging unit and the second imaging unit being optically connected in series.

8. The exposure device as recited in claim 1, further comprising:
   at least one adjustment unit configured to adjust the modulation beam and/or the modified modulation beam, the adjustment unit being a CMOS element.

9. The exposure device as recited in claim 1, further comprising:
   a positioning unit configured to position the recording material relative to the objective lens unit to enable the recording material to be sequentially exposed to the modified modulation beam.

10. The exposure device as recited in claim 1, further comprising:
    an additional modulation unit;
    an additional reduction unit; and
    an additional objective lens unit;
    wherein the additional modulation unit is configured to generate an additional modulation beam by impressing an additional modulation representing the holographic element onto an additional laser beam, the modulation beam representing the reference beam and the additional modulation beam representing the object beam, the additional reduction unit being configured to generate an additional modified modulation beam using the additional modulation beam, the additional modified modulation beam having a smaller beam diameter than the additional modulation beam, the additional objective lens unit being configured to direct the additional modified modulation beam through an additional immersion medium onto the recording material and to cause the recording material to interfere with the modified modulation beam to record the hologram.

11. The exposure unit as recited in claim 10, wherein the objective lens unit is configured to direct the modified modulation beam onto a first side of the recording material and the additional objective lens unit is configured to direct the additional modified modulation beam onto a second side of the recording material opposite the first side.

12. A method for recording a hologram using an exposure device, the exposure device including at least one modulation unit configured to generate a modulation beam representing a reference beam and/or an object beam by impressing a modulation representing at least one holographic element of the hologram on a laser beam, at least one reduction unit configured to generate a modified modulation beam using the modulation beam, the modified modulation beam having a smaller beam diameter than the modulation beam, and at least one objective lens unit configured to direct the modified modulation beam through an immersion medium onto a recording material to record the hologram by exposing the recording material to the modified modulation beam, the method comprising the following steps:
    impressing the modulation representing the holographic element onto the laser beam to generate the modulation beam;
    reducing the beam diameter of the modulation beam to generate the modified modulation beam; and
    directing the modified modulation beam through the immersion medium onto the recording material to record the hologram.

13. A method for controlling an exposure device, the exposure device including at least one modulation unit configured to generate a modulation beam representing a reference beam and/or an object beam by impressing a modulation representing at least one holographic element of the hologram on a laser beam, at least one reduction unit configured to generate a modified modulation beam using the modulation beam, the modified modulation beam having a smaller beam diameter than the modulation beam, and at least one objective lens unit configured to direct the modified modulation beam through an immersion medium onto a recording material to record the hologram by exposing the recording material to the modified modulation beam, the method comprising the following step:

outputting an activation signal to an interface to the modulation unit to impress the modulation representing the holographic element onto the laser beam.

14. A control unit including a unit configured to control an exposure device, the exposure device including at least one modulation unit configured to generate a modulation beam representing a reference beam and/or an object beam by impressing a modulation representing at least one holographic element of the hologram on a laser beam, at least one reduction unit configured to generate a modified modulation beam using the modulation beam, the modified modulation beam having a smaller beam diameter than the modulation beam, and at least one objective lens unit configured to direct the modified modulation beam through an immersion medium onto a recording material to record the hologram by exposing the recording material to the modified modulation beam, the unit configured to output an activation signal to an interface to the modulation unit to impress the modulation representing the holographic element onto the laser beam.

\* \* \* \* \*